United States Patent [19]

Kawabata et al.

[11] 4,442,340

[45] Apr. 10, 1984

[54] FOUR-ELECTRODE SUBMERGED ARC WELDING PROCESS

[75] Inventors: Fumimaru Kawabata; Atsushi Shiga, both of Chiba; Tadamasa Yamaguchi, Yotsukaido, all of Japan

[73] Assignee: Kawasaki Steel Corporation, Kobe, Japan

[21] Appl. No.: 434,379

[22] Filed: Oct. 14, 1982

[30] Foreign Application Priority Data

Oct. 20, 1981 [JP] Japan ............................... 56-166387

[51] Int. Cl.$^3$ .............................................. B23K 9/18
[52] U.S. Cl. ............................... 219/137 PS; 219/73; 219/123
[58] Field of Search ............... 219/73, 123, 137 PS, 219/130.1

[56] References Cited

U.S. PATENT DOCUMENTS

| | | | |
|---|---|---|---|
| 2,436,387 | 2/1948 | Harter et al. | 219/137 PS |
| 3,336,460 | 8/1967 | Hauck et al. | 219/123 |
| 3,456,089 | 7/1969 | Shrubsall | 219/73 R |
| 4,341,944 | 7/1982 | Breen | 219/123 |

Primary Examiner—C. C. Shaw
Attorney, Agent, or Firm—Balogh, Osann, Kramer, Dvorak, Genova & Traub

[57] ABSTRACT

A four-electrode submerged arc welding process employs connections of four electrodes aligned in one row for alternating current source so that electromagnetic force $\bar{F}x_4$ in a direction opposite to a welding direction acting upon a middle point of the arc from the rearmost electrode is within $-25 \lesssim \bar{F}x_4 \lesssim -10$ (N/m). The connections are preferably selected such that phase differences among currents applied to the three electrodes other than the frontmost or rearmost electrode are 120°, respectively, and a phase difference of the remaining frontmost or rearmost electrode is within $0° \pm 30°$ relative to the furthermost electrode.

With such connections of the four electrodes, the four-electrode submerged arc welding process remarkably prevents welding defects such as undercuts even at higher welding speeds.

5 Claims, 6 Drawing Figures

FOUR-ELECTRODE SUBMERGED ARC WELDING PROCESS

BACKGROUND OF THE INVENTION

1. Field of the Invention

This invention relates to a four-electrode tandem submerged arc welding process, and more particularly a four-electrode welding process capable of performing a submerged arc welding with high efficiency and high quality for manufacturing large-diameter steel pipes.

2. Description of the Prior Art

The submerged-arc welding process has been widely used for welding of large-diameter steel pipes which have been once formed in U-shaped cross-section by U-shaped dies and then in O-shaped cross-section by O-shaped dies. It has been strongly required to speed up the submerged arc welding in view of the requirement to improve the production efficiency in response to the rapidly increased demand of the large-diameter steel pipes, because the welding speed relates directly to the improvement of the production efficiency. Various investigations have been effected in order to improve the welding speed. To increase the number of electrodes is one of the solutions.

The three-electrode welding process has been mainly used for this purpose, which has brought about a great improvement of the welding speed in comparison with the two-electrode welding process. However, the welding speed achieved by the three-electrode welding process does not meet the welding speed now required.

There are many factors which would limit the welding speed, among which following two factors are important in the most cases:

(1) insurance of sufficient penetration depth, and
(2) avoidance of welding defects.

In general, the welding speed is determined by selecting the welding heat input (electric current × voltage/welding speed) to fulfil the condition of (1). In order to fulfil the condition at higher welding speeds, however, the electric current must be unavoidably increased. The increased current tends to increase "undercuts" which are grooves melted into the base metal adjacent to the toe of a weld which are left unfilled with weld metal and are thus opposed to the condition of (2). Moreover, if the welding speed is not increased enough to meet the increased current, the welding heat input is unduly increased to adversely affect the toughness of the welded metal. Under the circumstances, the three-electrode welding method cannot more increase the welding speed beyond that achieved at this stage.

In view of this, the four-electrode welding process is essential in order to rapidly increase the welding speed. However, the multielectrode process will cause electromagnetic interference of electrode current and ground current. Accordingly, a proper selection of current phases or connections between electrodes and power source which determine the interference is essential. If the selection is not correct, the welded quality becomes inferior and the high speed welding for the multielectrode welding process cannot be accomplished.

On the other hand, the increase of the number of the electrodes may rapidly increase the number of connections which are possible to choose theoretically, and this means difficulty of selection of the proper connections. Even if proper connections for the three-electrode welding process are applied to the four-electrode welding process, good results cannot be expected.

SUMMARY OF THE INVENTION

It is an object of the invention to provide an improved four-electrode submerged welding process employing connections for electrodes to prevent or suppress undercuts occurring at high welding speeds, thereby to allow greatly high welding speed with high quality of welded articles.

In order to achieve the object, the four-electrode submerged arc welding process with four electrodes L, $M_1$, $M_2$ and T aligned in one row from front to rear in a welding direction, all the electrodes being supplied with alternating current according to the invention, includes connecting the electrodes such that electromagnetic force $\bar{F}x_4$ in a direction opposite to the welding direction acting upon a middle point of an arc from said rearmost T electrode is substantially within $-25 \lesssim \bar{F}x_4 \lesssim -10$ (N/m).

In order that the invention may be more clearly understood, preferred embodiments will be described, by way of example, with reference to the accompanying drawings.

DETAILED DESCRIPTION OF THE PREFERRED EMBODIMENT

In general, welding speed of the submerged arc welding is limited in most cases by occurrence of undercuts, because the higher the welding speed, the stronger in one direction is the flow of melted steel directing rearward from immediately below an arc, resulting in lack of melted steel in forming beads. In order to prevent or suppress the undercut, it has been considered to be effective to control or reverse the melted steel directing rearward into a forward direction.

In the four-electrode submerged arc welding process, it is easily supposed from the investigation of the three-electrode welding process that a first electrode (L electrode) mainly serves to dig a base metal and a second electrode ($M_1$ electrode) and a third electrode ($M_2$ electrode) partially perform the digging action and partially build up melted steel or form beads, while a fourth electrode (T electrode) exclusively performs the bead forming action.

The inventors of this application have noticed the fourth electrode (T electrode) and investigated to prevent or suppress the undercut in welding at high speeds by suppressing the rapid rearward flow of the melted steel with the aid of pressure of T electrode arc controlledly deflected by suitable selection of connections for the current supplied to the electrodes.

However, there are a great number of connections for this purpose, which make it difficult to find the best connections. Accordingly, it is required to specify the respective connections quantitatively. In view of this, the inventors have calculated the electromagnetic force acting upon the T electrode arc so as to deflect it using the schematic model as shown in FIG. 1 to specify the respective connections and have found the undercut to be very effectively prevented or suppressed when the calculated electromagnetic force is within a specific range.

Figure 1:
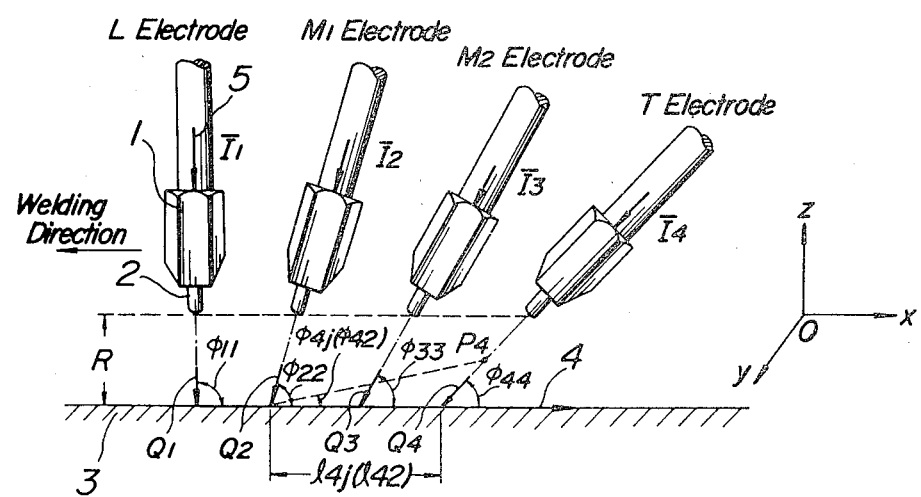
FIG. 1 is a explanatory view of a schematic model of an electrode arrangement for a four-electrode submerged arc welding process used for calculation of electromagnetic force.

In consideration of the functions of the respective electrodes in the four-electrode welding process, the L, $M_1$, $M_2$ and T electrodes are inclined at angles of $\phi_{11}-\phi_{44}$ (45°–90°) as shown in FIG. 1. The electromagnetic force $\bar{F}_{x4}$ acting upon the middle point $P_4$ of the T electrode arc in a welding direction is practically effectively indicated in the following equation according to the electromagnetics (assuming that the welding direction is negative).

$$\bar{F}_{x4} = \frac{\mu_0 \bar{I}_4}{2\pi R} \left( \sum_{j=1}^{3} \bar{I}_j \cot \frac{\phi_{4j} - \phi_{jj}}{2} \sin\phi_{4j} \sin 44 \cos\theta_{4J} - \sum_{j=1}^{4} \bar{I}_j(1 + \cos\phi_{4j})\cos\theta_{4j} \right) \quad (1)$$

where $\phi_{4j} = \cot^{-1}(\cot\phi_{4j} - l_{4j}/R)$   (2)

where j is number of electrodes (1–4),
$\bar{I}_j$ is effective value of current of j-th electrode,
R is presumed arc length (10 mm),
$l_{4j}$ is distance between the fourth electrode (T electrode) and j-th electrode (in the strict sense, distance between intersections of the surface of base metal and center axes of electrode),
$\mu_o$ is magnetic permeability in vacuum ($=4\pi \times 10^{-7}$ N/A$^2$), and
$\theta_{4j}$ is phase difference between effective values of current of fourth (T) and j-th electrodes.

Referring to FIG. 1, a reference numeral 1 denotes electrode tips having welding wires 2 in opposition to a base metal 3. Electrode current is denoted by 5 and ground current or earthing current by 4.

Figure 2:
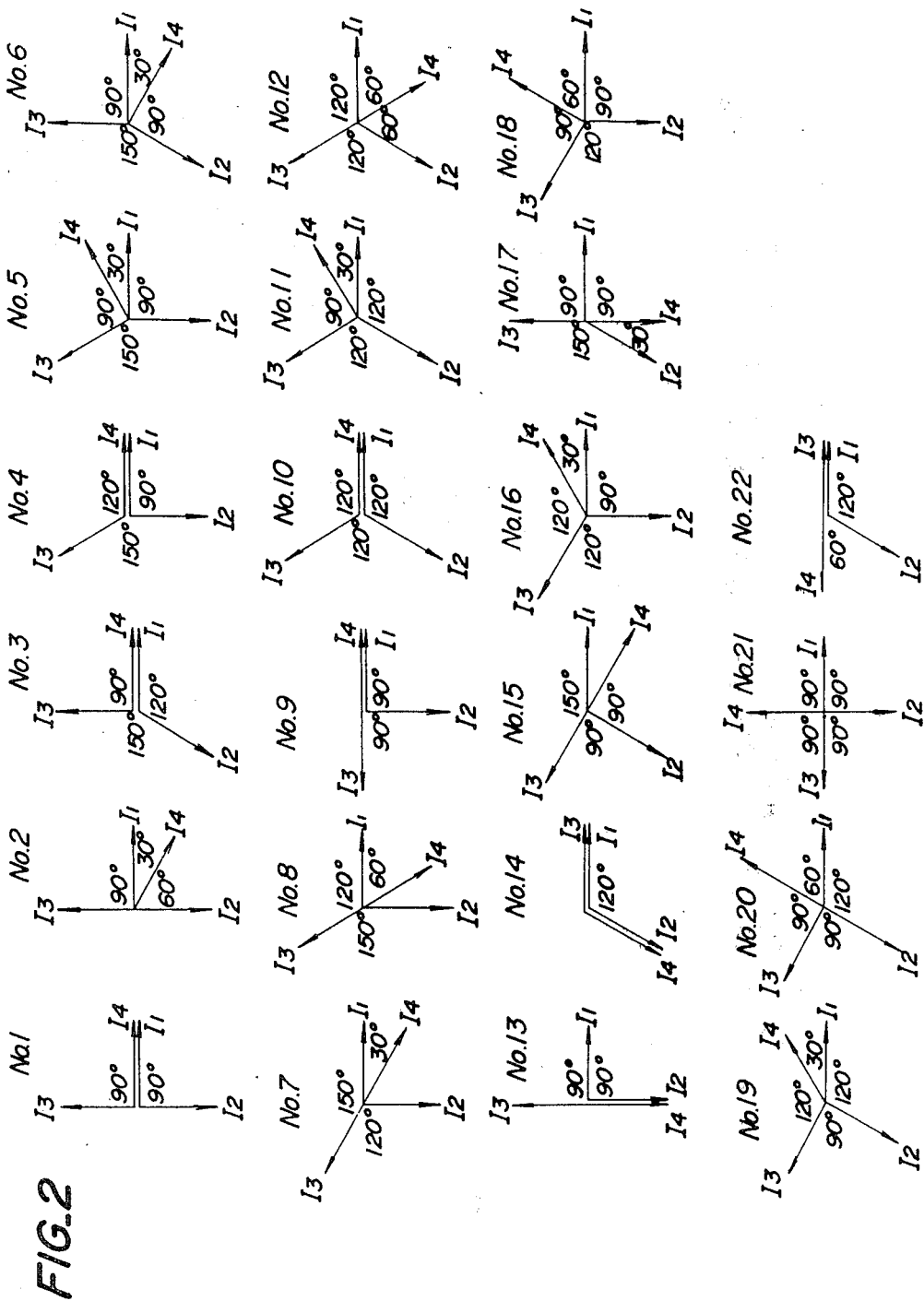
FIG. 2 illustrates various current phases for the four-electrode welding including the process according to the invention.

The electromagnetic force $\bar{F}_{x4}$ were calculated using the equations (1) and (2) under the welding conditions with appropriate heat input as shown in Table 1 as to various connections whose phase angles are shown in FIG. 2. It has been found in experiments that when the electromagnetic forces $\bar{F}_{x4}$ are within the range of $-25 \leq \bar{F}_{x4} \leq -10$ (N/m) with the connections Nos. 8–16 in FIG. 2, the undercuts are remarkably prevented or suppressed. Particularly, the connections Nos. 10, 11 and 16 whose electromagnetic forces are within the range of $-25 \leq \bar{F}_{x4} \leq -15$ (N/m) are optimum at higher welding speeds, although the range of the electromagnetic force is slightly narrower.

TABLE 1

| | Four-electrode welding condition and arrangement used for the calculation | | | | | |
|---|---|---|---|---|---|---|
| Electrode (j) | Current $I_j$ (A) | Voltage $E_i$ (V) | Inclination of electrode $\phi_{jj}$ (°) | Distance between electrode (mm) | Welding speed (cm/min) | Thermal input for welding (KJ/cm) |
| L (1) | 1150 | 38 | 90 | 13 | 220– | 37– |
| $M_1$ (2) | 1050 | 42 | 75 | 13 | 260 | 43 |
| $M_2$ (3) | 900 | 42 | 60 | 13 | | |
| T (4) | 800 | 42 | 45 | | | |

TABLE 2

| | Phase angles of connections and electromagnetic force | | | |
|---|---|---|---|---|
| No. | *$\theta_2$ (deg) | *$\theta_3$ (deg) | *$\theta_4$ (deg) | $\bar{F}_{x4}$ (N/m) |
| 1 | −90 | 90 | 0 | −43.0 |
| 2 | −90 | 90 | −30 | −39.3 |
| 3 | −120 | 90 | 0 | −29.8 |
| 4 | −90 | 120 | 0 | −29.7 |
| 5 | −90 | 120 | 30 | −26.1 |
| 6 | −120 | 90 | −30 | −26.0 |
| 7 | −90 | 150 | −30 | −25.9 |
| 8 | −90 | 120 | −60 | −25.6 |
| 9 | −90 | 180 | 0 | −16.4 |
| 10 | −120 | 120 | 0 | −16.4 |
| 11 | −120 | 120 | 30 | −16.4 |
| 12 | −120 | 120 | −60 | −15.8 |
| 13 | −90 | 90 | −90 | −15.3 |
| 14 | −120 | 0 | −120 | −14.9 |
| 15 | −120 | 150 | −30 | −12.7 |
| 16 | −90 | 150 | 30 | −12.7 |
| 17 | −120 | 90 | −90 | −11.8 |
| 18 | −90 | 150 | 60 | −6.3 |
| 19 | −120 | 150 | 30 | −3.0 |
| 20 | −120 | 150 | 60 | −2.7 |
| 21 | −90 | 180 | 90 | 11.1 |
| 22 | −120 | 0 | 180 | 25.5 |

*$\theta_2$, $\theta_3$ and $\theta_4$ indicate phase angles of current of $M_1$, $M_2$ and T electrodes relative to L electrode.

In the experiments, four electrodes for submerged arc welding were aligned with one another in a forward direction of welding and applied with three-phase alternating current. The connections Nos. 10, 11 and 16 that obtained the best results were such that the phase differences among currents applied to three electrodes other than the first L electrode or the last T electrode were 120°, respectively, and the current phase of the remaining electrode L or T was within 0°±30° relative to the furthermost electrode. With such connections, in order to obtain the best results the current and voltage were 1,100–1,250 A and 35–40 V for the L electrode, 1,000–1,150 A and 40–45 V for the $M_1$ electrode, 900–1,000 A and 40–45 V for the $M_2$ electrode and 750–900 A and 40–45 V for the T electrode. The inclined angles of the electrodes making with vertical lines and plus signed in a direction opposite to the welding direction were 0°±5° for the L electrode, 15°±5° for the $M_1$ electrode, 30°±5° for the $M_2$ electrode and 40°–45° for the T electrode. The distances between the electrodes were 13–20 mm for L and $M_1$ electrodes, 13–20 mm for $M_1$ and $M_2$ electrodes and 13–15 mm for $M_2$ and T electrodes. Under the above welding conditions, the objects of the present invention were achieved for the four-electrode tandem submerged arc welding process.

From the above experiment, it is clear that the undercut is effectively prevented or mitigated by using the connections whose electromagnetic forces $\bar{F}x_4$ are within $-25 \lesssim \bar{F}x_4 \lesssim -15$ (N/m) and connections suitable for preventing the undercuts become fewer at higher welding speeds and that even if the welding current is changed, the preferable range of $\bar{F}x_4$ scarcely changes.

Figure 3:
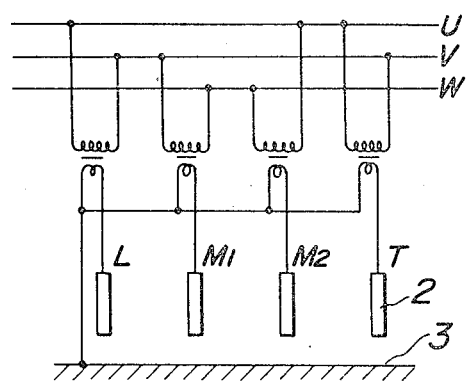
FIG. 3 illustrates a three phase power source connection according to one embodiment of the invention.

FIG. 3 illustrates one example of actual connections whose phase relation corresponds to No. 10 in FIG. 2.

The invention will be explained with reference to embodiment of the invention.

EXAMPLE 1

Figure 4:
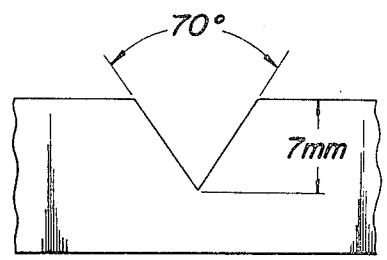
FIG. 4 is a sectional view of a base metal having a V-shaped groove used for the experiment for the invention.

Welding (in this case building up welding) was carried out on steel plates formed with V-shaped grooves having 70 degrees and 7 mm depth shown in FIG. 4 under the four-electrode welding conditions shown in Table 1. Undercut rates defined by overal length of undercut/(measured bead length×2) were obtained to judge the high speed welding working efficiency of the various connections in conjunction with observation of meander and unevenness of beads.

Figure 5:
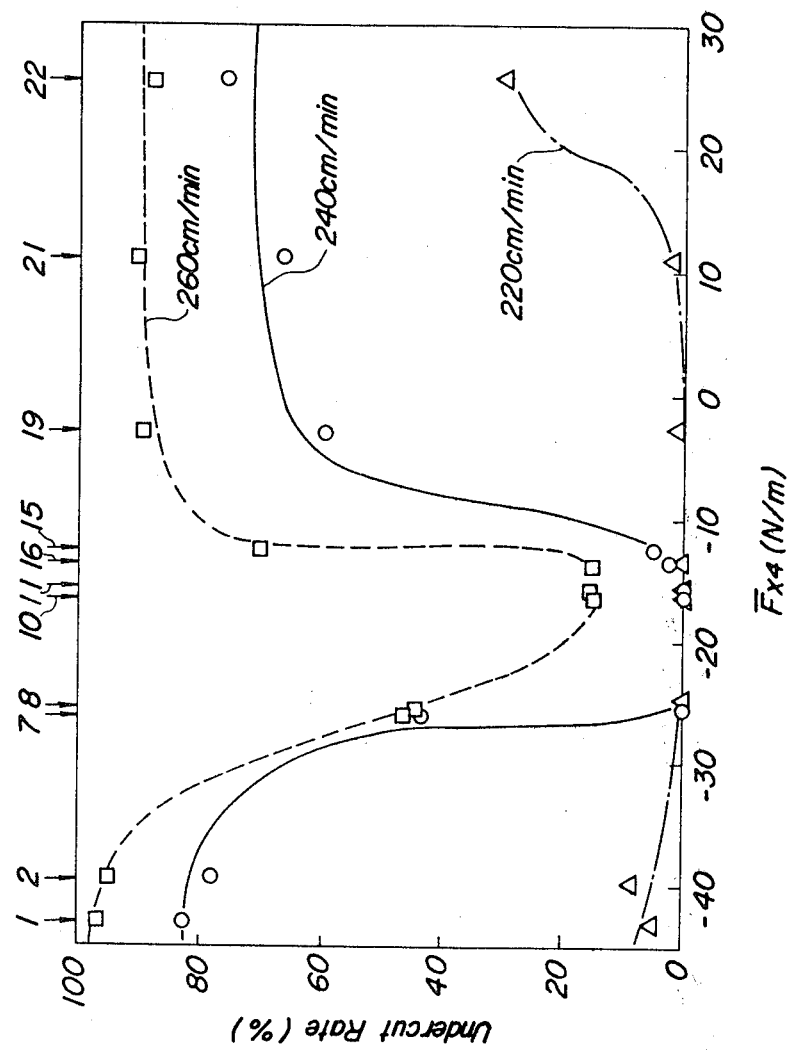
FIG. 5 is a graph of relations between connections and undercut rates concerned with welding speeds, comparing welding performance.

The connections used in the experiments are shown in FIG. 2. FIG. 5 illustrates the results at welding speeds 220, 240 and 260 cm/min which indicate the connections Nos. 10, 11 and 16 have the greatest effect for suppressing the undercut at these welding speeds. The connections Nos. 7, 8 and 15 exhibit comparatively good results at welding speeds 220 and 240 cm/min but cause remarkable undercuts at the higher welding speed 260 cm/min in comparison with the connections Nos. 10, 11 and 16. This means that the connections Nos. 10, 11 and 16 are also superior at higher welding speeds.

EXAMPLE 2

Figure 6:
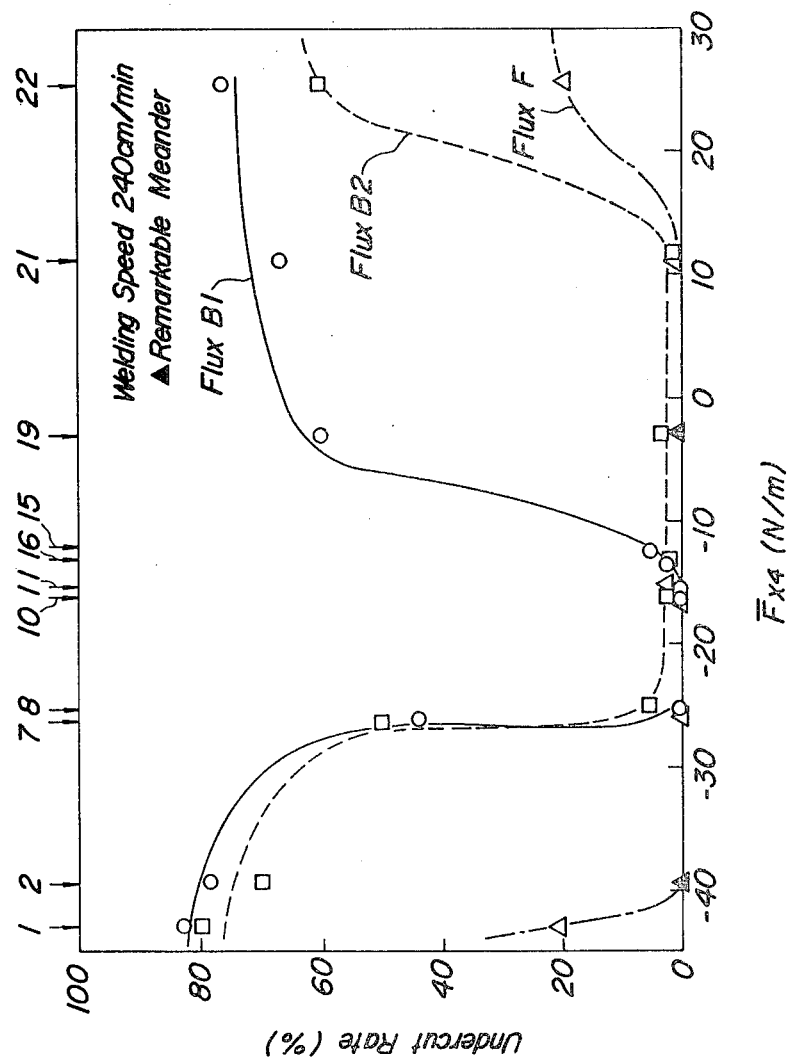
FIG. 6 is a graph of relations between connections and undercut rates concerned with used fluxes for welding, comparing welding performance.

The effect of the connections according to the invention was tested with three different fluxes, $SiO_2$—$CaO$—$CaF_2$ base fused type flux F and $SiO_2$—$TiO_2$—$Al_2O_3$—$MgO$ base sintered type fluxes B1 and B2. The welding was effected at welding speed 240 cm/min under the conditions shown in Table 1. The results of the experiment are shown in FIG. 6. It can be seen from FIG. 6 that the connections Nos. 10, 11 and 16 exhibit the good effect for suppressing the undercut regardless of the kinds of flux and do not cause the meander of beads.

EXAMPLE 3

Maximum possible welding speeds for the connections according to the invention were measured with various base metals having different thicknesses. Table 3 shows the results in comparison with those according to the prior three-electrode welding process (1,130 A and 35 V for first electrode, 850 A and 40 V for second electrode and 680 A and 40 V for third electrode). The four-electrode welding process with the connections Nos. 10, 11 and 16 according to the invention can increase the welding speed up to 1.5-2 times and decrease the welding heat input to about 80% in comparison with the three-electrode welding process.

TABLE 3

| | Comparison of the four-electrode welding process according to the invention with the three-electrode welding process | |
|---|---|---|
| Thickness of base metal (mm) | Four-electrode welding process according to the invention | Prior art three-electrode welding process |
| 38 | 100 cm/min, 96 KJ/cm | 50 cm/min, 122 KJ/cm |
| 25.4 | 170 cm/min, 56 KJ/cm | 90 cm/min, 68 KJ/cm |
| 19.5 | 240 cm/min, 40 KJ/cm | 130 cm/min, 47 KJ/cm |
| 12.7 | 250 cm/min, 36 KJ/cm | 180 cm/min, 33 KJ/cm |

As can be seen from the above description, in order to improve the welding efficiency without adversely affecting the welded quality, beyond the limitation of the three-electrode welding process, the four-electrode submerged arc welding process according to the invention employs the suitable connections of four electrodes for the alternating current source in consideration of the electromagnetic forces acting upon the electrode arc to achieve the remarkable improvement of the welding speed maintaining the good welded quality.

It is further understood by those skilled in the art that the foregoing description is that of preferred embodiments of the disclosed method and that various changes and modifications may be made in the invention without departing from the spirit and scope thereof.

What is claimed is:

1. A four-electrode submerged arc welding process with four electrodes L, $M_1$, $M_2$ and T aligned in one row from front to rear in a welding direction, all said electrodes being supplied with alternating current, comprising connecting said electrodes such that electromagnetic force $\bar{F}x_4$ in a direction opposite to said welding direction acting upon a middle point of an arc from said rearmost T electrode is substantially within $-25 \lesssim \bar{F}x_4 \lesssim -10$ (N/m).

2. A process as set forth in claim 1, wherein phase differences among currents supplied to the three electrodes other than the frontmost L or rearmost T electrode are 120°, respectively, and a phase difference of said remaining electrode L or T is within 0°±30° relative to the furthermost electrode.

3. A process as set forth in claim 1, wherein said electrodes are inclined from vertical line perpendicular to a surface of a base metal in the direction opposite to said welding direction at 0°±5° for the L electrode, 15°±5° for the $M_1$ electrode, 30°±5° for the $M_2$ electrode and 40°-45° for the T electrode, respectively.

4. A process as set forth in claim 1, wherein said electrodes are supplied with electric current and voltage, 1,100-1,250 A and 35-40 V for the L electrode, 1,000-1,150 A and 40-45 V for the $M_1$ electrode, 900-1,000 A and 40-45 V for the $M_2$ electrode and 750-900 A and 40-45 V for the T electrode, respectively.

5. A process as set forth in claim 1, wherein distances between axes of said electrodes are 13-20 mm for the L and $M_1$ electrodes, 13-20 mm for the $M_1$ and $M_2$ electrodes and 13-50 mm for the $M_2$ and T electrodes, respectively.

* * * * *